L. BOLLÉE.
PRESS FOR TESTING OR OTHER PURPOSES.
APPLICATION FILED MAY 6, 1910.
1,018,158.
Patented Feb. 20, 1912.
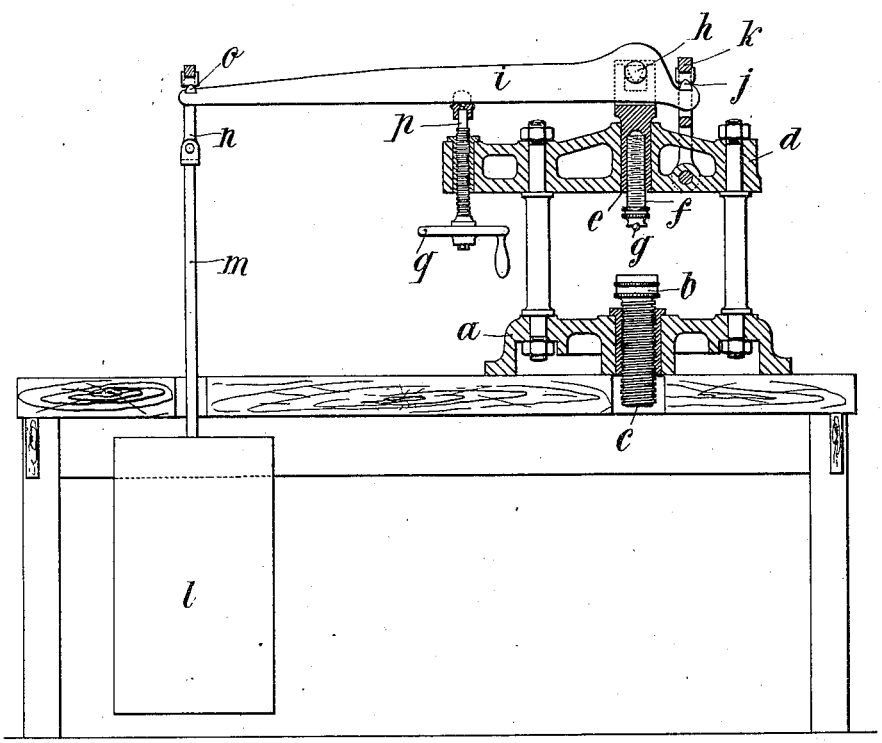

UNITED STATES PATENT OFFICE.

LÉON BOLLÉE, OF LE MANS, FRANCE.

PRESS FOR TESTING OR OTHER PURPOSES.

1,018,158.  Specification of Letters Patent.  Patented Feb. 20, 1912.

Application filed May 6, 1910. Serial No. 559,704.

*To all whom it may concern:*

Be it known that I, LÉON BOLLÉE, a citizen of the French Republic, residing at Le Mans, France, have invented certain new and useful Improvements in Presses for Testing or other Purposes, of which the following is a specification.

This invention relates to a press for testing machinery or other purposes comprising a balance beam or lever with a weight, or a balance beam with a sliding weight of the type known as the "steel yard," the balance lever of which effects the compression in a press, which compression is always strictly the same as long as the weight or the position of the sliding body remain unchanged, or is known exactly if the weight in question or the position of the sliding body are modified. One of the chief applications of the said lever press is for testing the hardness of metals, by producing with a known force the impression of a known body, for instance of a ball (Brinell ball method), or the testing of the quality of cutting tools, knives, etc., by pressing against the cutting edge a given hard body which breaks or bends the said cutting edge under a more or less great load, to determine the quality of the tool. The apparatus can also be used for making any accurate impression for any purpose whatsoever. It can also be used for testing springs.

The accompanying drawing shows diagrammatically an apparatus according to this invention, which comprises a frame to which is secured a base $a$ provided with a head $b$, adjustable by means of a screw $c$, and surmounted by columns supporting a top $d$.

The balance lever $i$ carries knife edges $o$, $h$, $j$. The latter is secured to a fixed point $k$ while the first one supports the weight $l$ by means of a shackle $n$ and a rod $m$, and the second one is secured to a slide or plunger $e$ sliding vertically in guides in which is secured an adjustable die carrier or support $f$ and a body $g$ intended to produce the impression. The lever is held in raised position by means of a screw $p$ which can be lowered by means of a hand wheel $q$, thus allowing the whole pressure of the lever $i$ to be applied slowly to the body to be impressed, arranged between the head $b$ and the body $g$. As both the head $b$ and the die carrier $f$ are adjustable vertically, and as the plunger $e$ slides vertically, objects of widely different sizes can be tested without appreciably altering the angular position of the lever $l$, the pressure exerted by the body $g$ is always in the same direction, vertical, and even if the angular position of the lever $l$ were changed, the couple exerted on the test piece by a given weight is constant for all sizes of test piece.

What I claim as my invention and desire to secure by Letters Patent is:—

1. A press for testing or other purposes comprising a plunger, means for guiding the plunger vertically, a pivoted lever adapted to apply pressure to said plunger, a weight on said lever for producing said pressure and means longitudinally adjustable on said plunger for producing an impression.

2. A press for testing or other purposes comprising an adjustable pressure head, a plunger coöperating therewith, means for guiding the plunger vertically, a pivoted lever adapted to apply pressure to said plunger, a weight on said lever for producing said pressure, means for controlling the downward movement of said lever and means longitudinally adjustable on said plunger for producing an impression.

3. A press for testing or other purposes comprising an adjustable pressure head, a plunger coöperating therewith, means for guiding the plunger vertically, an adjustable die carrier or support on said plunger, a pivoted lever adapted to apply pressure to said plunger, means on said lever for producing said pressure, a screw for controlling the downward movement of said lever and means in said die carrier for producing an impression.

In testimony whereof I have signed my name to this specification in the presence of two subscribing witnesses.

LÉON BOLLÉE.

Witnesses:
 VICTOR DUPON,
 H. C. COXE.

Copies of this patent may be obtained for five cents each, by addressing the "Commissioner of Patents, Washington, D. C."